July 31, 1962

A. WOLINSKY 3,047,855

MOTION SENSING SYSTEM

Filed March 12, 1959

INVENTOR.
ALBERT WOLINSKY

BY

ATTORNEY

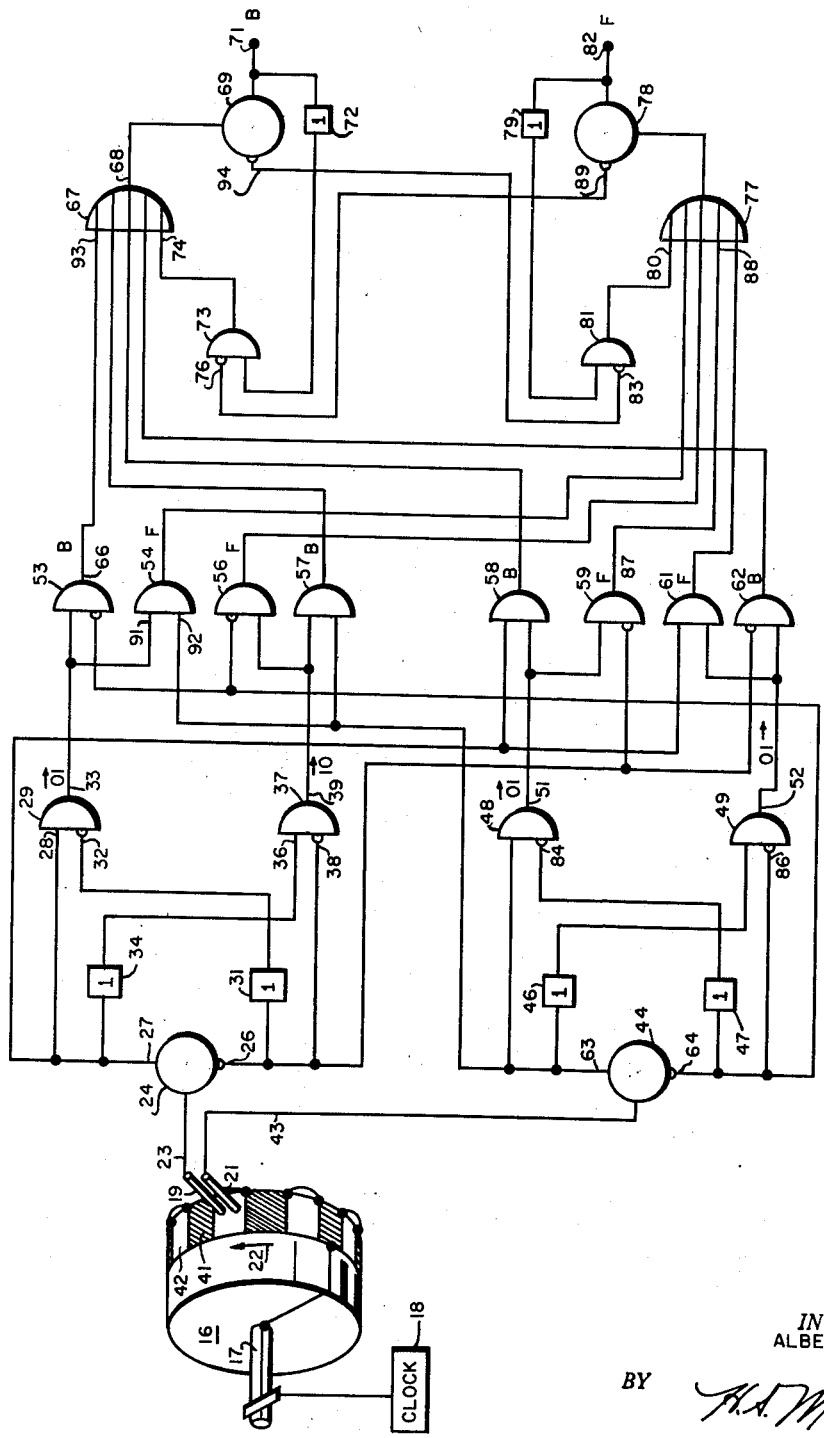

United States Patent Office 3,047,855
Patented July 31, 1962

3,047,855
MOTION SENSING SYSTEM
Albert Wolinsky, New Rochelle, N.Y., assignor to General Precision, Inc., a corporation of Delaware
Filed Mar. 12, 1959, Ser. No. 799,012
6 Claims. (Cl. 340—347)

This invention relates to systems for sensing the motion of an object in a single degree of freedom and more specifically for distinguishing between the forward and backward directions of motion of translation or rotation.

It is frequently useful and necessary to distinguish, in digital computers, between forward and backward directions of rotation elements. A specific application is the sensing and indication by logical elements of the direction of rotation of the code wheel element of an analog-to-digital converter. The present invention provides a sensing and indicating device for such use. However, the invention is applicable not only to the sensing of motion of a code wheel, but to the sensing of motion of any object whatever. The only restrictions are that a bi-element pattern can be attached to the object and a pair of sensing elements can be positioned adjacent thereto for the sensing of relative motion.

The principal purpose of this invention is to provide an instrument for sensing and indicating the direction of displacement of a binary pattern.

Another purpose is to provide instrumentation for sensing the direction of rotation of a rotary binary code pattern device.

Still another purpose is to provide an instrument including one zone of a binary code pattern device and a pair of sensing devices associated with that single zone, together with associated equipment, for producing output signals representing motion of the code pattern device in one or the other direction.

The present invention is applicable to code patterns representing any binary digital code since all such patterns have the common characteristic of having a number of binary place zones with each zone composed of two different types of fields in alternation. The pair of sensing devices may be applied to any zone of the code pattern, but for maximum resolution is preferably applied to the least significant zone.

In the simplest embodiment of this invention use is not confined to code pattern zones having equal-length fields but may be applied to zones in which the field lengths differ within the zone.

A further understanding of this invention may be secured from the detailed description and associated drawings, in which:

FIGURE 2 depicts a circuit embodying the invention.

FIGURES 3, 4, 5, 6, 7, and 8 illustrate several positions which a code pattern zone can take relative to a pair of sensing devices.

Figure 1:
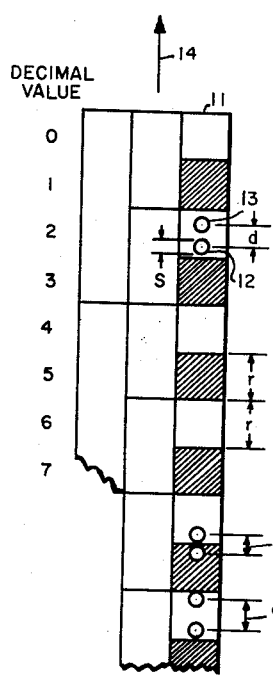
FIGURE 1 illustrates a natural binary digital code pattern.

Referring now to FIG. 1, there is indicated the application of this invention to a code pattern representing the natural binary digital code. The fragmentary pattern of FIG. 1 represents the first few numbers of this code, and consists of three vertical columns or zones including at the right the zone 11 representing the least significant digits of the binary numbers. Each zone consists of alternate white and cross-hatched rectangles. When such a pattern is wrapped around a cylinder to form a code cylinder and provided with sensing devices to distinguish between the white and cross-hatched rectangles, the assembly becomes the sensing part of an analog-to-digital converter. Two sensing devices are indicated by the circles 12 and 13 positioned to sense the rectangles or fields of the least significant zone. These sensing devices may include photosensitive elements if the white and cross-hatched rectangles are to be sensed by their optical properties, or may consist of electrical brushes bearing on the zone fields if the white fields represent nonconductive areas and the cross-hatched fields represent conductive areas. Alternatively, the bi-elements or fields of two kinds may differ in any other material properties either mechanical, electrical, magnetic or chemical, and be associated with suitable elements for discerning these differences. It is assumed that the code cylinder can be rotated while the brushes or other sensing devices 12 and 13 are fixed. That is, functioning of the code cylinder is consequent upon relative motion having occurred between the code cylinder and the pair of pickups or brushes. These pickups are in all cases held at a fixed and unchanged mutual separation in the longitudinal direction indicated by the arrow 14.

The direction in which this arrow 14 points is the forward direction of motion of the code cylinder relative to the pickups and is the direction in which the pickups register increasing values of the binary numbers. The opposite direction is that of backward motion, in which the registered binary number values successively decrease.

The length of a field in the sensed zone is termed $r$, the effective extent of the sensing element in the longitudinal direction is termed $s$, and the distance between the centers of the two pickups is termed $d$. Any one of the transverse boundaries between a white and a cross-hatched rectangle is termed a transition. If, in forward or backward motion of the code pattern, a pickup passes from a white field representing the binary digit 0 to a cross-hatched or dark field representing the binary digit 1, the transition is termed a 01 transition. If the pickup transits from a dark to a light field, the transition is termed at 10 transition.

Certain values of pickup separation, $d$, are permitted while others are not. This is based on the requirement that the two pickups must not be placed so as to register transitions simultaneously. Consequently, the pair of pickups must not be placed so close together as to touch or, worse, to overlap. That is, it is required that $d > s$. Also, the pickups must not be separated so far that, while one senses one transistion, the other senses the next transition, or $d < r - s$. The combined rule thus is $$s < d < r - s \qquad (1)$$

It is not necessary that all of the fields in the sensed zone have the same longitudinal dimension. Although the usual binary code patterns do have equal-length fields, a code pattern may be imagined in which the fields are of unequal lengths. The invention is applicable to such a code pattern and the expression (1) is still true with the provision that the field length, $r$, is the length of the shortest field of the pattern.

It is evident that, with equal-length fields, if one or both of the pickups 12 and 13 be moved in either direction by exactly twice, or more generally, even multiples of, the length of a field, the operation will be the same as before. It is also true that if one or both of the pickups be moved by one, or more generally, odd multiples of one, field length, the operation is similar but not identical. Defining $n$ as any positive integer, not zero, the limitations on the separation of the brushes including such moves by whole field lengths are formulated as $$(n-1)r + s < d < nr - s \qquad (2)$$

When $n = 1$, the inequality (2) becomes inequality (1). When $n$ is odd, the logic circuit which is about to be described is applicable without change; when $n$ is even, a similar but not identical circuit must be employed. It is to be noted that, when $n$ is not 1, all fields must be of the same length.

In FIG. 2 a code cylinder 16 on a shaft 17 is arranged for rotation. A single zone of a code pattern is shown, consisting of alternate light and dark rectangles representing insulating and conducting fields respectively. The light fields or rectangles may represent the binary digit 0, and the dark ones represent the digit 1. All conducting fields are wired together and to the shaft 17. A clock element such as is employed in logical circuits and which may consist of an oscillator operating, for example, at 1 megacycle per second, is represented by the rectangle 18, with output connected to the shaft 17. A pair of electrical brushes 19 and 21 is arranged to bear on the commutator surface of the depicted zone and is spaced circumferentially by one-half of the length of one of the equal fields. This is the median distance between the maximum and minimum distances of expression (1), or of (2) for $n=1$. The forward direction of rotation of the cylinder 16 is the direction relative to the brushes shown by the arrow 22. The opposite direction is termed the backward direction of rotation.

Brush 19 is connected through conductor 23 to the input terminal of an inverter amplifier 24. This element may be, for example, an electronic tube amplifier having an odd number of stages. The inverted waveform output is taken from output terminal 26 while an uninverted output is taken from output terminal 27.

The uninverted output terminal 27 is connected to the input terminal 28 of an INHIBIT-AND circuit 29. The inverted output terminal 26 is connected to a delay circuit 31 marked with a "1," indicating that it interposes a time delay of one clock pulse period. The delay circuit 31 is connected to the inhibiting input terminal 32 of the INHIBIT-AND circuit 29. This circuit 29, when energized by application of a pulse to the input terminal 28, emits a pulse at the output terminal 33 if, and only if, simultaneously there is no inhibiting pulse at input terminal 32. The output terminal 27 is also connected through a second delay circuit 34 to the input terminal 36 of a second INHIBIT-AND circuit 37. The inverted output terminal 26 is connected to the inhibiting input terminal 38 of the INHIBIT-AND circuit 37.

This circuit composed of elements 24, 31, 34, 29, and 37 is a transition detector and indicator, for it emits a single pulse at output terminal 33 when the brush 19 transits a 01 transition, and emits a single pulse at output terminal 39 when the brush 19 transits a 10 transition. For example, suppose that brush 19 passes from field 41 to field 42 during backward rotation of the code cylinder. While the brush is on field 41, the INHIBIT-AND circuit 37 in inhibited by pulses impressed on the inhibiting input terminal 38. But the last pulse emitted from brush 19 as it leaves the conducting segment 41 is delayed in delay circuit 34, so that, by the time it arrives at the input terminal 36, there is no inhibiting input at input terminal 38 and the INHIBIT-AND circuit 37 emits a single pulse at output terminal 39. The presence of this pulse at this point indicates that the transition passed was a 10 transition. Similarly, emission of a single pulse at output terminal 33 would indicate that the transition was a 01 transition.

The brush 21 is similarly connected through conductor 43 to an identical transition detector and indicator consisting of inverter-amplifier 44, delay circuits 46 and 47, and INHIBIT-AND circuits 48 and 49. An output pulse at one of the output terminals 51 and 52 indicates passage by brush 21 of a 01 or a 10 transition, respectively.

The output terminal 33 of the brush 19 transition indicator circuit is connected to one input terminal each of an INHIBIT-AND circuit 53 and an AND circuit 54. The latter has two inputs and emits an output only if both inputs are simultaneously pulsed. Similarly, output terminal 39 is connected to an INHIBIT-AND circuit 56 and an AND circuit 57. Output terminal 51 is connected to an AND circuit 58 and an INHIBIT-AND circuit 59. Output terminal 52 is connected to an AND circuit 61 and an INHIBIT-AND circuit 62. The output terminal 27 of inverter-amplifier 24 is connected to AND circuits 58 and 61 and the inverted output terminal 26 thereof is connected to the inhibiting input terminals of INHIBIT-AND circuits 59 and 62. The output terminal 63 of inverter amplifier 44 is connected to AND circuits 54 and 57, and the inverted output terminal 64 thereof is connected to the inhibiting input terminals of INHIBIT-AND circuits 53 and 56.

The output terminal 66 of INHIBIT-AND circuit 53 is connected to one of the five input terminals of an OR circuit 67. This circuit emits an output at its output terminal 68 whenever an input is applied to any one or more of its input terminals. Three other input terminals are connected to the output terminals of AND circuits 57 and 58 and INHIBIT-AND circuit 62. The output terminal 68 is connected to the input terminal of an inverter-amplifier 69. Its uninverted output at output terminal 71 constitutes one of the outputs of the motion sensing system. This terminal 71 is also connected through a delay circuit 72 and an INHIBIT-AND circuit 73 to the fifth input terminal 74 of the OR circuit 67.

The closed circuit consisting of OR circuit 67, inverter-amplifier 69, delay circuit 72, INHIBIT-AND circuit 73, and OR circuit input terminal 74 constitutes a pulse-train-generating circuit operating as follows. Upon application of a single pulse to any input terminal of the OR circuit 67, a pulse is emitted and applied through inverter-amplifier 69 to the delay circuit 72. After a delay of one pulse period the pulse is applied through INHIBIT-AND circuit 73 to input terminal 74, and the cycle is repeated. Thus, a train of pulses is created and is emitted at output terminal 71. This pulse train, once having been started, can be stopped only by application of a pulse to the inhibiting input terminal 76 of the INHIBIT-AND circuit 73.

An OR circuit 77, inverter-amplifier 78, delay circuit 79, INHIBIT-AND circuit 81, and OR circuit input terminal 80 constitute another, similar pulse-train-generating circuit with a system output terminal 82. Upon application of a pulse to any one or more of the five input terminals of the OR circuit 77, a pulse train is initiated at output terminal 82 which can be terminated only by application of a pulse to the inhibiting input terminal 83 of the INHIBIT-AND circuit 81. Four of the input terminals of the OR circuit 77 are connected, respectively, to the output terminals of AND circuits 61 and 54, and INHIBIT-AND circuits 59 and 56.

In the operation of the circuit of FIG. 2, when both brush pickups 19 and 21 are on a nonconducting segment as depicted, no signals can be generated at any of the four output terminals 33, 39, 51, and 52 of the two transition sensing circuits. Also, no signals are emitted when both brushes are on a conducting segment because all four inhibiting input terminals 32, 38, 84, and 86 are energized. However, when one of the brushes is at a transition, eight cases are possible.

Figure 3:
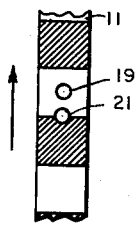

FIG. 3 represents one of the eight cases in forward motion with brush 21 at a 01 transition and brush 19 on an insulating segment. Then, in FIG. 2, output terminals 33 and 39 emit no outputs. The first pulse through brush 21 passes through INHIBIT-AND circuit 48 and causes a single output pulse at output terminal 51. Pulses thereafter are inhibited and all pulses through INHIBIT-AND circuit 49 are inhibited. The pulse at output terminal 51 is applied to AND circuit 58 but, since there is no second input, this circuit does not emit any output. The pulse at output terminal 51 is also applied to INHIBIT-AND circuit 59. Since this circuit has no inhibiting input, it emits a pulse at output terminal 87. Inspection shows that this pulse can occur only during forward rotation; consequently, output terminal 87 is marked "F."

The output terminal 87 is connected to input terminal 88 of OR circuit 77, so that the single pulse applied thereto causes the pulse-train-generating circuit to generate a pulse train in the manner described, and to emit the train at output terminal 82. At the same time an inverted pulse train is emitted from the inverted output terminal 89 of inverter-amplifier 78 and is applied to the inhibiting input terminal 76 of the other pulse-train generator, stopping its train generation if it be generating.

Figure 4:
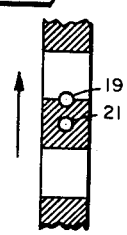

Movement of the code cylinder one-half field forward from the position shown in FIG. 3 brings its position relative to brushes 19 and 21 to the condition depicted in FIG. 4. Brush 21 is on a conducting segment and brush 19 is on a 01 transition. A pulse is therefore emitted at output terminal 33 of INHIBIT-AND circuit 29 and a pulse train is transmitted from brush 21 through inverter-amplifier 44 to AND circuit 54. Thus, both input terminals, 91 and 92, of AND circuit 54 are energized and the circuit transmits a pulse to OR circuit 77, resulting again in a pulse train at output terminal 82. Since this terminal already is emitting a pulse train, the action at this transition does not disturb this emission, which therefore continues.

Similarly, one-half field later the situation of FIG. 5 exists and brush 21, at a 10 transition, causes pulse emission at output terminal 52 and transmission of the pulse through AND circuit 61. The pulse train at output terminal 82 is thereby continued.

Figure 6:
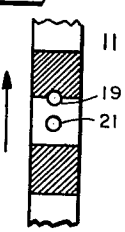

One-half field later the situation is as shown in FIG. 6, with brush 19 at a 10 transition. INHIBIT-AND circuit 56 emits a pulse which results in the continuance of the pulse train at the system output terminal 82.

Figure 7:
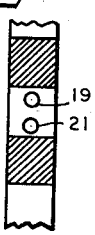
Figure 8:
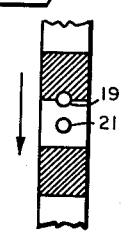

Let it be supposed that the system output terminal 82 is emitting a pulse train, that the forward motion of the code cylinder proceeds from the position depicted in FIG. 6 to the position of FIG. 7, that the forward motion stops and reverses, and that then the code cylinder revolves in the backward direction. The situation then soon becomes as shown in FIG. 8, with brush 19 at a 01 transition and brush 21 on an insulated field. This situation is the same as that of FIG. 6 except for the direction of rotation. There is then produced an input pulse at the activating input terminal of INHIBIT-AND circuit 53, as a result of which an output is emitted at output terminal 66, indicating backward rotation. This terminal 66 is therefore marked "B." This pulse is transmitted to the input terminal 93 of OR circuit 67, resulting in a pulse train at the system output terminal 71. At the same time the inverted pulse emitted from output terminal 94 of inverer-amplifier 69 is applied to the inhibiting input terminal 83 of INHIBIT-AND circuit 81, stopping the pulse train at output terminal 82.

Figure 5:
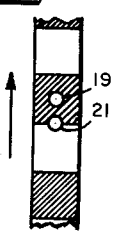

As the backward motion of the code cylinder continues, the brushes take the relative positions successively shown by FIGS. 5, 4, and 3, disregarding the "forward" arrows thereon, resulting in successive emissions of pulses from AND circuits 58 and 57 and INHIBIT-AND circuit 62, respectively. In each case a pulse is transmitted to the OR circuit 67 and the output pulse train at output terminal 71 continues.

In general, then, when either brush registers a transition it, in cooperation with the other brush, initiates a pulse train indicating whether the code wheel rotation is forward or backward. This pulse train continues uninterruptedly until the code wheel rotation brings the next transition under a brush. If this transition is crossed in the same direction, the pulse train is continued without interruption. If the code wheel should become stationary, the pulse train continues to be emitted. If the code wheel reverses its direction of rotation, the pulse train is shifted from the one output terminal to the other output terminal at the first transition registered by either brush after the reversal.

Summing up, in forward rotation a continuous pulse train is emitted at output terminal 82 and in backward rotation a continuous pulse train is emitted at output terminal 71. The initiation of a pulse train at either one of these output terminals stops the pulse train at the other output terminal.

What is claimed is:

1. A system for sensing the direction of motion of an object comprising, a sensing pattern composed of alternate sectors representative of one or the other of a pair of values affixed to said object, a clock imposing a train of pulse signals on alternate ones of said sectors, a pair of sensing devices positioned adjacent said pattern each of which senses the values represented by the sectors immediately adjacent thereto and produces sensing signals therefrom, means producing relative movement between said object and said pair of sensing devices, means connected to each of said sensing devices for producing one transit signal pulse only during the interval in which the value sensed by either sensing device changes from one to the other of said pair of values and producing another transit signal pulse only during the interval in which the value sensed changes from the other to said one of said pair of values, and means having said sensing signals and said transit signals impressed thereon and producing one or the other of a pair of direction signals therefrom.

2. A system for sensing the direction of motion of an object comprising, a sensing pattern composed of alternate sectors representative of one or the other of a pair of values affixed to said object, a clock imposing a train of pulse signals on alternate ones of said sectors, a pair of sensing devices positioned adjacent said pattern each of which senses the values represented by the sectors immediately adjacent thereto and produces sensing signals therefrom, means producing relative movement between said object and said pair of sensing devices, means connected to each of said sensing devices for producing one transit signal pulse only during the interval in which the value sensed by either sensing device changes from one to the other of said pair of values and producing another transit signal pulse only during the interval in which the value sensed changes from the other to said one of said pair of values, first logic means having selected ones of said sensing siganls and said transit signals impressed thereon and producing therefrom a first direction signal pulse indicative of motion of said object in one direction, and second logic means having selected ones of said sensing signals and said transit signals impressed thereon and producing therefrom a second direction signal pulse indicative of motion of said object in the opposite direction.

3. A system for sensing the direction of motion of an object comprising, a sensing pattern composed of alternate sectors representative of one or the other of a pair of values affixed to said object, a clock imposing a train of pulse signals on alternate ones of said sectors, a pair of sensing devices positioned adjacent said pattern each of which senses the values represented by the sectors immediately adjacent thereto and produces sensing signals therefrom, means for producing inverted sensing signals from the sensing signals produced by each of said pair of sensing devices, means producing relative movement between said object and said pair of sensing devices, first logic means having the sensing signal and inverted sensing signal derived from one of said pair of sensing devices impressed thereon and producing therefrom a pair of transit pulse signals one of which is indicative of and occurs only during the time of change of said sensing signal from one value to the other of said pair of values and the other of which is indicative of and occurs only during the time of a change of said sensing signal from said other to said one of said pair of values, second logic means having the sensing signal and inverted sensing signal derived from the other sensing device impressed thereon and producing therefrom a pair of transit pulse signals one of which is indicative of and occurs only during the time of change of the sensing signal from one value to the other of said pair of values and the other of which is indicative of and occurs only during the time of change of said sensing signal from said other value to said one value of said pair of values, and means having said sensing signals, inverted sensing signals, and said transit signals impressed thereon and producing therefrom one or the other of a pair of direction signals.

4. A system for sensing the direction of motion of an object comprising, a sensing pattern composed of alternate sectors representative of one or the other of a pair of values affixed to said object, a pair of sensing devices positioned adjacent said pattern each of which senses the values represented by the sectors immediately adjacent thereto and produces sensing signals therefrom, means for producing inverted sensing signals from the sensing signals produced by each of said pair of sensing devices, means producing relative movement between said object and said pair of sensing devices, first logic means having the sensing signal and inverted sensing signal derived from one of said pair of sensing devices impressed thereon and producing therefrom a pair of transit signals one of which is indicative of a change of said sensing signal from one value to the other of said pair of values and the other of which is indicative of a change of said sensing signal from said other to said one of said pair of values, second logic means having the sensing signal and inverted sensing signal derived from the other sensing device impressed thereon and producing therefrom a pair of transit signals one of which is indicative of change of the sensing signal from one value to the other of said pair of values and the other of which is indicative of change of said sensing signal from said other to said one of the pair of values, third logic means having said sensing signals, inverted sensing signals, and transit signals impressed thereon and combined in selected pairs and producing therefrom a first direction signal pulse indicative of motion of said object in one direction, and fourth logic means having said sensing signals, inverted sensing signals, and transit signals impressed thereon and combined in selected pairs and producing therefrom a second direction signal pulse indicative of motion of said object in the opposite direction.

5. A motion sensing system for indicating sense of direction of motion comprising, a device whose direction of motion is to be sensed having incorporated thereon a pattern composed of sectors alternating in the direction of motion, said alternating sectors being representative of different values, a pair of sensing elements each positioned to sense the values of said alternate sectors and to produce a signal of one value or another value depending on the sector being sensed, said pair being positioned in a line parallel to the direction of motion, means for producing a 01 transition signal at the instant the signal produced by one of said pair of sensing elements changes from said one value to the other value and producing a 10 transition signal at the instant the signal produced by said one of the pair of sensing elements changes from said other value to said one value, means for producing a second 01 transition signal at the instant the signal produced by the other of said pair of sensing elements changes from said one value to the other value and producing a second 10 transition signal at the instant the signal produced by the said other of the pair of sensing elements changes from the said other value to said one value, means operated by said 01 and 10 transition signals when said other of the pair of sensing elements produces a signal of one value for producing signals indicative of motion of said device in one or the other direction, means operated by said second 01 and second 10 transition signals when said one of the pair of sensing elements produces a signal of one value for producing signals indicative of motion of said device in the other or one direction, means operated by said 01 and 10 transition signals when said other of the pair of sensing elements produces a signal of said other value for producing signals indicative of motion of said device in the other or one direction, and means operated by said second 01 and second 10 transition signals when said one of the pair of sensing elements produces a signal of said other value for producing signals indicative of motion of said device in the one or the other direction, means converting said four signals indicative of motion of said device in one direction into a first signal train, means converting said four signals indicative of motion of said device in the other direction into a second signal train and means interlocking said two last-named means so that the start of either train stops the other train.

6. A motion sensing system for indicating direction of rotation comprising, a rotating member having incorporated thereon 0 and 1 segments alternating in the direction of motion, a clock pulse generator, means applying a pulse train generated thereby to said 1 segments, first and second sensing elements juxtaposed to said segments in a line parallel to said motion thereat, said elements being spaced apart by a distance greater than $(n-1)r+s$ in which $n$ is any positive integer, not zero, $r$ is the length of the least segment, and $s$ is the length of each of said sensing elements, and being spaced apart by a distance less than $nr-s$, said sensing elements being positioned to sense said clock pulses applied to said 1 segment and to emit a signal representative thereof, a first transition-indicating circuit indicating by first 01 and 10 signals when said first sensing element passes a transition boundary from a 0 segment to a 1 segment and from a 1 segment to a 0 segment respectively, a second transition-indicating circuit indicating by second 01 and 10 signals when said second sensing element passes a transition boundary from a 0 segment to a 1 segment and from a 1 segment to a 0 segment respectively, a first pair of AND circuits, a first pair of INHIBIT-AND circuits, means applying said first and second 01 and 10 signals thereto, means applying said sensing element signals thereto whereby single pulse signals representative of rotation in one direction are emitted, a second pair of AND circuits, a second pair of INHIBIT-AND circuits, means applying said first and second 01 and 10 signals thereto, means applying said sensing element signals thereto whereby second single-pulse signals representative of rotation in the direction opposite to said one direction are emitted, a first pulse-train generator converting said single-pulse signals into a first pulse train, a second pulse-train generator converting said second single-pulse signals into a second pulse train, and means interlocking said first and second pulse-train generators to stop either by the start of the other.

References Cited in the file of this patent

UNITED STATES PATENTS

| | | |
|---|---|---|
| 2,685,082 | Beman et al. | July 27, 1954 |
| 2,750,584 | Goldfischer | June 12, 1956 |
| 2,779,539 | Darlington | Jan. 20, 1957 |
| 2,873,440 | Speller | Feb. 10, 1959 |